Jan. 6, 1925.
E. B. WILCOX
SIGNAL
Filed March 25, 1924
1,521,800
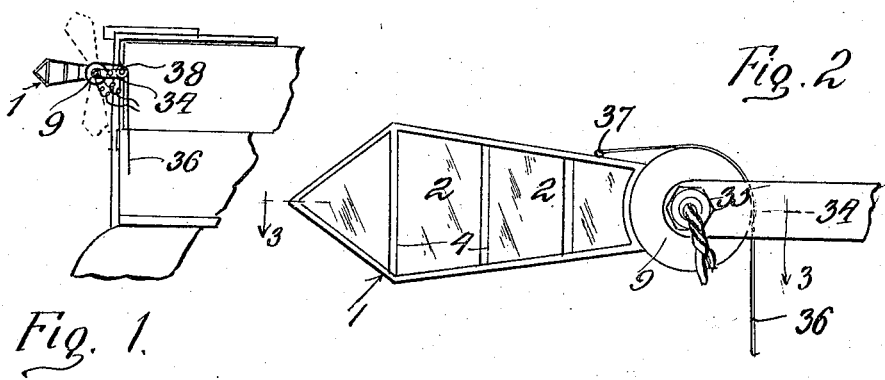
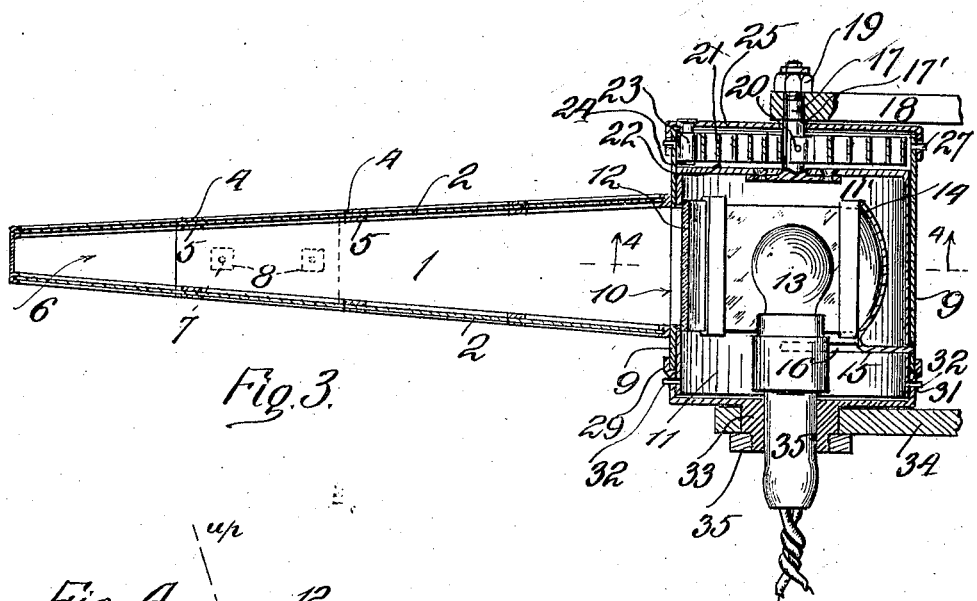
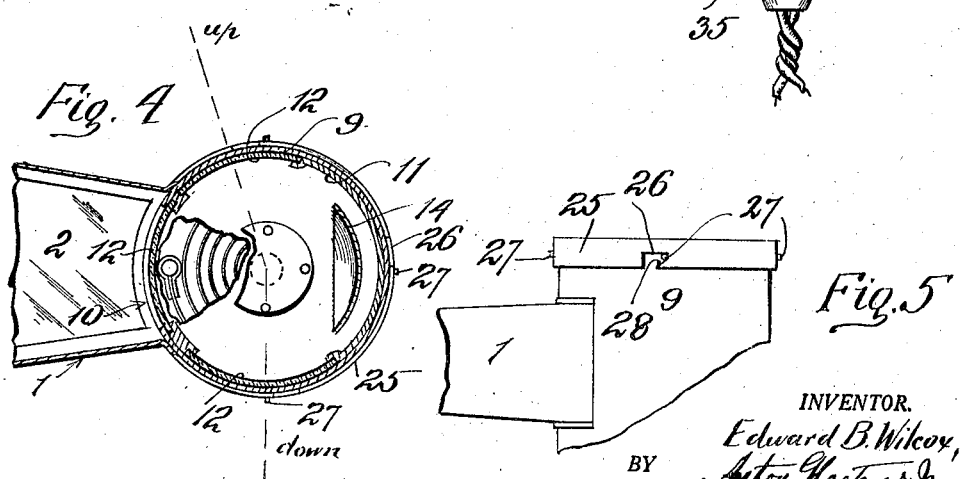
INVENTOR.
Edward B. Wilcox,
BY
Anton Hoefner Jr
ATTORNEY Patented Jan. 6, 1925.

1,521,800

UNITED STATES PATENT OFFICE.

EDWARD B. WILCOX, OF LOS ANGELES, CALIFORNIA.

SIGNAL.

Application filed March 25, 1924. Serial No. 701,837.

*To all whom it may concern:*

Be it known that I, EDWARD B. WILCOX, a citizen of the United States, residing at Los Angeles, county of Los Angeles, and State of California, have invented a certain new and useful Signal, of which the following is a specification.

My invention relates to a signalling device especially adapted for use on motor vehicles and it has particular reference to an indicating device which will readily draw the attention of drivers of other vehicles and clearly explain to following machines the intention of the operator as to the direction he will follow.

The object of the invention is to provide a simple, effective and compact device of the character referred to, by which, with simple mechanism and simple assembly of parts, an unmistakable signalling may be accomplished.

Another object of the invention is to provide an indicating element or arm which may be conspicuously illuminated to make it visible at considerable distances and from various angles.

Other objects of the invention will appear from the following specification, in connection with the accompanying drawing, which is illustrative of the invention and represents a form in which the invention may be embodied.

In the drawing,

Fig. 1 is an elevation of the device shown mounted in operative position upon the windshield of an automobile, the dotted lines indicating various positions of movement.

Fig. 2 is a rear view of the indicator arm.

Fig. 3 is an enlarged sectional view on line 3—3, Fig. 2.

Fig. 4 is an enlarged section on lines 4—4, Fig. 3, and

Fig. 5 is a fragmentary detail showing a means for associating one of the caps with the cylinder of the indicating arm.

The invention is shown as comprising an index member 1, which may take the form of an arrow or be of any other shape, design or outline best suited for the purpose. For purposes of illumination by natural or artificial means, the index member 1 may be made hollow and provided with translucent or transparent panes 2 of glass or any other material, and these panes 2 may be of any color or combination of colors most desirable for the needs. The panes or transparent surfaces 2 may be held in place in any suitable manner, and for purposes of this disclosure the index member 1 may comprise a structural unit, as shown, having the shape desired and provided on the front and rear faces with connecting and spaced reinforcing strips 4 and 5 which hold in place the panes 2. The apex or free end 6 of the index or arrow, where an arrow is used, is formed preferably for dissociation from the main structure for facilitating repair and replacement of parts. For this purpose, the apex or free end 6 of the arrow is detachably connected by bolts 7 and nuts 8 with the body of the member 1.

The arrow or indicating arm 1 is shown as comprising a part of a cylinder 9, which is provided with an opening 10, through which rays of light may be projected into and illuminate the arrow, as explained hereinafter. The cylinder or cylindrical part 9 of the indicating arm 1 is mounted for movement upon a suitable support, which is shown as comprising a hollow drum 11, provided with a plurality of openings which are preferably supplied with panes 12 of translucent or transparent material of any color. These panes are arranged to be brought into register successively with the opening 10 through which illumination of the arrow or indicator, provided by a source of light, as an electric light bulb 13, is effected. The movement of the arrow or indicator in a circular plane brings the opening 10, between it and the cylinder 9, in line with the panes 12 in succession, and the registry of but one of the panes 12 with the opening 10 can be effected by the movement of the arm. To cause a focusing or projection of the rays from the source of light 13, through the panes 12 and into the hollow indicator, I may provide a reflector 14, which is preferably positioned diametrically opposite the opening 10 and behind the source of light 13. Preferably this reflector 14 is attached to the cylindrical portion 9 of the arrow or indicator 1 in such manner that it moves with the indicator and relatively to the hollow drum 11. For this purpose, the reflector may be provided with a tongue or extension 15 which may be attached in any manner to the cylinder. This tongue or extension 15 is preferably bent at substantially right angles to the reflector, as shown, in Fig. 3, and such bent portion is passed through an elongated peripheral slot 16, provided in the hollow drum 11, whereby the arrow or indicator 1, with the attached reflector 14 may move relatively to said hollow drum.

On one side, the hollow drum 1, about which the indicator is movable, is provided with a trunnion 17, having a reduced portion 17' extending through one member or arm 18 of a bracket which supports the indicator and in which it is operable. A nut 19 serves to hold the trunnion 17 and arm 18 in connected relation. On said trunnion 17, is fastened one end 20 of a spring 21, the coils of which, as shown in Fig. 3, lie in a housing 22, formed by the end wall 11' of the drum 11, and by the portion of the cylindrical part 9 of the indicating arm which extends beyond this end wall. The other end 23 of said spring 21, is secured to a stud 24, which is mounted on a cap 25, and which cap 25 is flanged to connect with and fit over the end of the cylindrical portion 9 of said indicating arm 1, in such manner as to be movable relatively thereto and also therewith. The movement of the cap 25 in one direction relative to said cylindrical portion 9 winds the spring 21 to its initial tension, which is exerted upon the indicator arm, with the connected cap, to hold same in a position of definite direction, to wit, as shown, downward. The movement of said indicator arm 1 to indicating position, obviously is accomplished against the tension of said spring 21, and whenever any pressure tending to overcome said spring tension is relieved, the indicator returns automatically to normal position. The cap 25, in order to be movable in a circular plane relative to said cylindrical portion 9, is formed with notches 26, which extend inwardly from the flanged edge thereof and into these notches project a plurality of pins 27, which are integral with the cylindrical portion. One side of the notches 26, is V-shaped, as seen at 28, and these V-shaped portions are forced and held in engagement with the projecting pins 27, by the spring 21. When winding the spring, the cap 25 is moved in a direction away from the V-shaped notches and out of the range of the pins, and when sufficient tension has been given the spring, the cap is replaced with the pins re-entered into the notches 26 and seated in the V-shaped portions thereof, whereby the cap is held against movement. The arrow is held against movement beyond a definite one, owing to the spring pressure, by any device, not shown, or by the frame of the windshield.

The hollow drum, upon which turns the indicator arm 1, is open at one side, that is, at the end opposite the end wall 11', to accommodate the lighting means 13, and for purposes of convenience. Over the open end of said drum is fitted a cap 29, which is provided with indentations or notches 30, and V-shaped recesses 31, for engagement with radial pins 32 on said drum 11. This cap 29 is formed with a squared boss 33 for receiving the other member 34 of the bracket which supports the indicator. A nut 35 threading on the reduced part 36 of said boss serves to hold the bracket arm in position and the two bracket arms 34 and 18 are secured together in any desirable manner and onto a convenient part of a motor vehicle. By them, the parts of the indicator described, are held together and by the bracket member 34, the cap 29 and the drum 11 associated with it, is held stationary at all times, while the indicator arrow 1 is freely movable in the arc of a circle against the tension of the spring 21. Through the boss 33 on the cap 29 is extended a socket 35' for the source of illumination.

Any means may be employed for operating the indicator to the various positions required by traffic rules. One such means may comprise a cable 36, attached to a crossmember 37, on the indicator and run over the cylindrical portion 9, and a pulley or roller 38. By pulling on the cable, the indicator may be raised to the desired position against the tension of the spring 21, the tendency of which is constantly to hold the indicating arrow in the downwardly directed position as shown in Fig. 1, and to return it to such position when no pull is exerted on the cable. Means for moving the indicating arm to its definite indicating positions may also be provided, as well as means for effecting illumination only when the indicator is in certain positions.

What I claim, is;

1. An indicator comprising an indicator member formed with a cylindrical portion and an opening between said cylindrical portion and said member, a hollow drum upon which said cylindrical portion of said member is movable, said drum having a plurality of openings arranged for successive registration with the opening between said member and the cylindrical portion thereof, and provided with a peripheral slot, a reflector carried by the cylindrical portion of said indicator member and having a part thereof extended through said slot, means to hold said drum stationary relative to said indicator member, a coiled spring carried in one side of said drum and having one end connected to said indicator member to hold same in inoperative position, and means to operate said indicator member.

2. An indicator comprising an indicator member formed with a cylindrical portion and an opening between said cylindrical portion and said member, a reflector connected and movable with said member, a hollow drum upon which said indicating member is movable, said drum having a peripheral slot through which said reflector is extended, a flat coiled spring on one side of said drum and connected at one end to said drum, a cap mounted on the cylindrical portion of said indicator arm, for relative revolution in one direction only, the other ends of said spring connected to said cap, said cap operable to increase the tension of said spring, and means to operate said indicator arm.

In testimony whereof I have set my hand.

EDWARD B. WILCOX.